United States Patent [19]

Edema

[11] Patent Number: 5,621,066
[45] Date of Patent: Apr. 15, 1997

[54] ENVIRONMENTALLY FRIENDLY METHOD FOR POLY(PHENYLENE ETHER) POLYMERIZATION AND CATALYST RECYCLE

[75] Inventor: Jilles J. H. Edema, LX Bergen Op Zoom, Netherlands

[73] Assignee: General Electric Company, Pittsfield, Mass.

[21] Appl. No.: 288,176

[22] Filed: Aug. 10, 1994

[51] Int. Cl.$^6$ .................................. C08G 65/38
[52] U.S. Cl. .................. 528/215; 528/214; 528/216; 528/217
[58] Field of Search ................. 528/214, 215, 528/216, 217

[56] References Cited

U.S. PATENT DOCUMENTS

| 3,306,874 | 2/1967 | Hay | 528/215 |
|---|---|---|---|
| 3,306,875 | 2/1967 | Hay | 260/47 |
| 3,733,299 | 5/1973 | Cooper et al. | 528/215 |
| 3,896,047 | 7/1975 | Aycock et al. | 568/451 |
| 3,900,445 | 8/1975 | Cooper et al. | 528/215 |
| 3,914,266 | 10/1975 | Hay | 556/110 |
| 3,921,260 | 11/1975 | Frohlich | 24/401 |
| 3,988,297 | 10/1976 | Bennett et al. | 528/215 |
| 4,059,568 | 11/1977 | Cooper et al. | 528/215 |
| 4,071,500 | 1/1978 | Cooper et al. | 260/47 |
| 4,092,294 | 5/1978 | Bennett et al. | 528/215 |
| 4,477,650 | 10/1984 | Mobley | 528/215 |
| 4,675,377 | 6/1987 | Mobley | 528/215 |

FOREIGN PATENT DOCUMENTS

| 4341068 | 6/1995 | Germany . |
|---|---|---|

OTHER PUBLICATIONS

Swiderska–Broz, M. Effluent Water Treat. J. (1984), 24(6), 218–24.

*Primary Examiner*—Samuel A. Acquah

[57] ABSTRACT

An environmentally friendly process is provided for the preparation of poly(phenylene ether) resin by oxidatively coupling at least one monovalent phenol using an oxygen containing gas and a complex copper (I) amine catalyst as the oxidizing agent and extracting the copper catalyst with an aqueous containing solution as a copper (II)-organic acid salt, an improvement which comprises reduction and recovery of the copper (II) species as a copper (I) species for regeneration of the complex copper (I) amine catalyst.

15 Claims, No Drawings

ENVIRONMENTALLY FRIENDLY METHOD FOR POLY(PHENYLENE ETHER) POLYMERIZATION AND CATALYST RECYCLE

BACKGROUND OF THE INVENTION

This invention relates to an environmentally friendly polymerization process for making poly(phenylene ether) resin (referred to hereafter as "PPE") which comprises recycling the metal catalyst used in the oxidative polymerization of phenols.

PPE are commercially attractive materials because of their unique combination of physical, chemical, and electrical properties. Furthermore, the combination of PPE with other resins provides blends which result in additional overall properties such as chemical resistance, high strength and high flow.

The processes most generally used to produce PPE involve the self-condensation of at least one monovalent phenol in the presence of an oxygen containing gas and a catalyst comprising a metal amine complex. Manganese, copper and cobalt can be used as the metal in the catalyst and copper (I) species are the most commonly utilized. These processes are typically carried out in the presence of an organic solvent and the reaction is usually terminated by removal of the catalyst from the reaction mixture. Various chelating agents are used for this purpose with the most effective being those which bind tightly to the metal to make a soluble metal complex. The catalyst metal, as a soluble metal complex, can be efficiently removed from the polymer solution with standard extraction techniques, such as liquid-liquid extraction. The polymer can be isolated in a variety of methods, such as anti-solvent precipitation or total isolation to provide a substantially catalyst free PPE. The metal complex in the solution also typically contains some amount of water in addition to organic solvent present as a contaminant. After the separation of the polymer from the solution, the metal complex, for example, copper complex containing solution is treated with an aqueous solution of sodium hydrosulfide to precipitate the copper as copper sulfides. The copper sulfides containing solution is disposed of as chemical waste following the appropriate governmental guidelines and laws.

It is therefore apparent that a long felt need exists for the development of methods to recycle the copper metal of the catalyst to provide an environmentally friendly PPE polymerization process.

SUMMARY OF THE INVENTION

The long felt need discussed above has been generally satisfied by the discovery of an environmentally friendly process for preparing PPE comprising recovery and regeneration of the reaction polymerization catalyst The description which follows provides further details regarding this invention.

DETAILED DESCRIPTION OF THE INVENTION

This invention provides for an environmentally friendly process for the preparation of PPE by oxidative coupling at least one monovalent phenol species, preferably having substitution in at least the two ortho positions and hydrogen or halogen in the para position, using an oxygen containing gas and a complex metal-amine catalyst, preferably a copper (I)-amine catalyst, as the oxidizing agent and extracting the metal catalyst with an aqueous containing solution as a metal-organic acid salt, an improvement which comprises reduction of the metal species from a higher oxidative state to a lower oxidative state for regeneration of the complex metal-amine catalyst.

The PPE employed in the present invention are known polymers comprising a plurality of structural units of the formula (I)

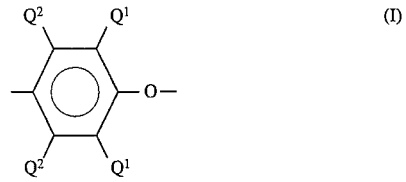

wherein each structural unit may be the same or different, and in each structural unit, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two poly(phenylene ether) chains to produce a higher molecular weight polymer, provided a substantial proportion of free OH groups remains.

The PPE generally has a number average molecular weight within the range of about 3,000–40,000 and a weight average molecular weight within the range of about 20,000–80,000, as determined by gel permeation chromatography. The intrinsic viscosity of the PPE is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling and they typically contain at least one heavy metal compound such as a copper, manganese or cobalt compound, usually in combination with various other materials.

It will be apparent to those skilled in the art from the foregoing that the PPE contemplated in the present invention include all those presently known, irrespective of variations in structural units or ancillary chemical features.

The polymerization of the phenolic monomer may be carried out by adding the phenolic monomer to a suitable reaction solvent and preferably a copper-amine catalyst. It is preferred to carry out the polymerization in the presence of a cupric salt-secondary amine catalyst such as, for example, cupric chloride and di-n-butylamine. The polymerizations are advantageously carried out in the presence of an inorganic alkali metal bromide or an alkaline earth metal bromide. The inorganic bromides may be used at a level of from about 0.1 mole to about 150 moles per 100 moles of phenolic monomer. These catalyst materials are described in U.S. Pat. No. 3,733,299 (Cooper et al.) which is hereby incorporated by reference.

Tetraalkylammonium salts may also be employed as promoters if desired. These promoters are disclosed in U.S. Pat. No. 3,988,297 (Bennett et al.), which is hereby incorporated by reference.

The primary, secondary or tertiary amine component of the catalyst complex generally correspond to those disclosed in U.S. Pat. Nos. 3,306,874 and 3,306,875 (Hay) which are incorporated herein by reference. Illustrative members include aliphatic amines, including aliphatic mono- and di-amines, where the aliphatic group can be straight or branched chain hydrocarbon or cycloaliphatic. Preferred are aliphatic primary, secondary and tertiary monoamines and tertiary diamines. Especially preferred are mono-, di- and tri(lower) alkyl amines, the alkyl groups having from 1 to 6 carbon atoms. Typically, there can be used mono-, di- and tri-methyl, ethyl, n-propyl i-propyl, n-butyl substituted amines, mono- and di-cyclohexylamine, ethylmethyl amine, morpholine, N-(lower) alkyl cycloaliphatic amines, such as N-methylcyclohexylamine, N,N'-dialkylethylenediamines, the N,N'-dialkylpropanediamines, the N,N,N,'-trialkylpentanediamines, and the like. In addition, cyclic tertiary amines, such as pyridine, alpha-collidine, gamma picoline, and the like, can be used. Especially useful are N,N,N',N'-tetraalkylethylenediamines, butane-diamines, and the like.

Mixtures of such primary, secondary and tertiary amines may be used. A preferred mono alkyl amine is n-butyl amine; a preferred dialkyl amine is di-n-butyl amine; and a preferred trialkyl amine is triethylamine. A preferred cyclic tertiary amine is pyridine. The concentration of primary and secondary amine in the reaction mixture may vary within wide limits, but is desirably added in low concentrations A preferred range of non-tertiary amines comprises from about 2.0 to about 25.0 moles per 100 moles of monovalent phenol. In the case of a tertiary amine, the preferred range is considerably broader, and comprises from about 0.2 to about 1500 moles per 100 moles of monovalent phenol. With tertiary amines, if water is not removed from the reaction mixture, it is preferred to use from about 500 to about 1500 moles of amine per 100 moles of phenol. If water is removed from the reaction, then only about 10 moles of tertiary amine, e.g., triethylamine or triethylamine, per 100 moles of phenol need be used as a lower limit. Even smaller amounts of tertiary diamines, such as N,N,N'N'-tetramethylbutanediamine can be used, down to as low as about 0.2 mole per 100 moles of phenol.

Typical examples of cuprous salts and cupric salts suitable for the process are shown in the Hay patents. These salts include, for example, cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts include the halides, alkanoates or sulfates, e.g., cuprous bromide and cuprous chloride, cupric bromide and cupric chloride, cupric sulfate, cupric fluoride, cuprous acetate and cupric acetate. With primary and secondary amines, the concentration of the copper salts is desirable maintained low and preferably varies from about 0.2 to 2.5 moles per 100 moles of monovalent phenol. With tertiary amines, the copper salt is preferable used in an amount providing from about 0.2 to 15 moles per 100 moles of the monovalent phenol.

Cupric halides are generally preferred over cuprous halides for the preparation of the copper amine catalyst because of their lower cost. The use of the copper (I) species also greatly increases the rate of oxygen utilization in the early stages of the polymerization reaction and the lower oxygen concentration in the head space of the reactor helps in reducing the risk of fire or explosion in the reactor. The faster initial reaction rate with the copper (I) based catalyst also results in less accumulation of unreacted monomer and a reduction in the amount of tetramethyldiphenylquinone produced. A process for the preparation and use of suitable copper-amine catalysts is in U.S. Pat. No. 3,900,445 (Cooper et al.), which is incorporated herein by reference.

The polymerization reaction is preferably performed in a solvent. Suitable solvents are disclosed in the above-noted Hay patents. Aromatic solvents such as benzene, toluene, xylene and o-dichlorobenzene are especially preferred, although tetrachloromethane, trichloromethane, dichloromethane, 1,2-dichloroethane and trichloroethylene may also be used.

The process and reaction conditions for the polymerization, such as temperature, oxygen flow rate and the like are essentially the same as the conditions disclosed in the above mentioned Hay patents though the reaction time to generate high-molecular weight polymer is reduced. The above noted concentration ranges are preferred, through these ranges may vary to some extent depending upon oxygen flow rate, reaction temperature and the like.

Many diverse extractants or chelating agents may be used in the practice of the invention. For example, sulfuric acid, acetic acid, ammonium salts, bisulfate salts and various chelating agents may be used. When these materials are added to a PPE reaction solution, the copperamine catalyst becomes poisoned and further oxidation does not take place. Many different materials may be used but it is preferred to employ those chelating agents that are disclosed in U.S. Pat. No. 3,838,102 (Bennett et al.) which is hereby incorporated by reference.

The useful chelating agents include polyfunctional carboxylic acid containing compounds such as, for example, sodium potassium tartrate, nitrilotriacetic acid (NTA), citric acid, glycine and especially preferably they will be selected from polyalkylenepolyamine polycarboxylic acids, aminopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts. The preferred agents include ethylenediaminetetraacetic acid (EDTA), hydroxyethylenediaminetriacetic acid, diethylenetriaminepentaacetic acid and their salts. Especially preferred are ethylenediaminotetraacetic acid or a mono-, di-, tri- and tetrasodium salt thereof and the resulting copper complex can be referred to as a copper carboxylate complex.

The chelated metallic catalyst component can be extracted with the water produced in the polymerization reaction by centrifuging and decanting, and then the polymer can be recovered. The preferred extraction liquid for use in the process of the invention is an aqueous solution of lower alkanol, i.e., a mixture of water and an alkanol having from 1 to about 4 carbon atoms. Generally from about 1% to about 80% by volume of an alkanol or glycol may be employed. The continuous phase of the aqueous extracting liquid is formed by controlling the flow rates and insuring that there is an excess of aqueous phase to organic phase. These ratios may vary from about 1.1 to about 10:1 parts by volume of aqueous liquid extractant to discrete organic phase.

When strong complexing ligands, such as NTA, are utilized in the process it is often advantageous to add a disproportionating metal species to the solution mixture to release the copper (I) species from the complexation ligand. The disproportionating metal counter ion should bind more tightly to the ligand than does copper (I) and should remain soluble in the solution after complexation with the ligand. Additionally, the resulting metal-ligand complex produced should itself be environmentally friendly for later disposal. Metal ions above copper in the electromotive series for copper would displace the copper species. Non-limiting examples in the series include calcium, zinc, magnesium, aluminum, manganese, iron, etc. The choice of the anionic salt portion of the metal species should be chosen based, in part, on solubility and environmental friendliness factors. Appropriate metal salts would include aluminum sulfate, zinc sulfate, iron (II) and iron (III) sulfates, calcium sulfate, and the like.

Mild reducing agents are generally suitable. A mild reducing agent is one which donates electrons readily but still is not capable of reducing the metallic ion catalyst component all of the way to the zero valent metal under the conditions of the process. Illustrative reducing agents comprise, for example, sulfur suboxides, such as sulfur dioxide or sulfurous acid, sodium bisulfite or sodium thionite, salts of metals in the lower valences of those compounds, such as tin (II) chloride, iron (II) sulfate, chromium (II) sulfate or titanium (III) chloride. Also suitable are nitrogen-containing reducing agents, such as hydroxylamines and their salts, in addition to phosphites, such as diethylphosphite and mild organic reducing agents like glucose and ascorbic acid. Especially preferred is sodium sulfite.

The reaction media generally comprises an aqueous environment. Anti-solvents can also be utilized in combination with the aqueous media to help drive the precipitation of the copper (I) species. The selection of an appropriate anti-solvent is based partially on the solubility co-efficient of the copper (I) species that is being precipitated. The halides are highly insoluble in water, log $K_{sp}$ values at 25° C. are $-4.49$, $-8.23$ and $-11.96$ for CuCl, CuBr and CuI, respectively. Solubility in water is increased by the presence of excess of halide ions due to the formation of, e.g., $CuCl_2^-$, $CUCl_3^{2-}$, and $CuCl_4^{3-}$ and by other complexing species. Non-limiting examples of anti-solvents would comprise low molecular weight alkyl and aromatic hydrocarbons, ketones, alcohols and the like which in themselves would have some solubility in the aqueous solution. One skilled in the art would be able to select an appropriate type and amount of anti-solvent, if any was utilized.

The temperature to carry out the present invention generally ranges from about 0° C. to about 95° C. More preferably, the temperature range is from about 5° C. to about 30° C. At substantially higher temperatures, side reactions can occur leading to reaction by-products and at temperatures substantially lower, ice crystals form in the aqueous solution.

All patents cited by reference are incorporated herein by reference.

In order that those skilled in the art will be better able to practice the invention, the following examples are given by way of illustration and not by way of limitation.

EXAMPLE

PPE Polymerization

The catalyst solution can be prepared by stirring 0.41 g of cuprous bromide and 10.9 g of di-n-butyl amine in 100 ml of toluene. The catalyst is transferred to a one liter stirred glass reactor equipped with an internal cooling coil and inlet tubes for oxygen and monomer. A rapid stream of oxygen is introduced near the bottom of the reactor and a solution of 70 g of 2,6-xylenol in 100 ml of toluene is added through a metering pump, over a period of fifteen minutes, to the rapidly stirred solution. The temperature is maintained at about 30° C. by circulating water from a constant temperature bath through the cooling coil. At about 60, about 90 and about 120 minutes after the beginning of monomer addition, samples of the reaction mixture are withdrawn, stirred with a small amount of 50% aqueous acetic acid, centrifuged, and the polymer solution is decanted. The polymer can be precipitated by addition of methanol, filtered washed with methanol, and dried under vacuum. Intrinsic viscosities are measured in chloroform solution at 30° C. and are typically measured as 0.29, 0.48 and 0.57 dl/g respectively for the 60, 90 and 120 minutes reaction aliquots.

Copper Removal with EDTA

The copper catalyst was removed from a PPE solution comprising about 16% by weight of poly(2,6-dimethyl-,1, 4-phenylene ether) resin in toluene obtained from the oxidative coupling of 2,6-dimethylphenol in the presence of a copper-amine complex catalyst by contacting the PPE solution first with an aqueous solution of about 38% by weight of the trisodium salt of ethylenediaminetetraacetic acid, to produce a mixture of the poly(phenylene ether) solution comprising about 4% by volume of an aqueous solution of copper-ethylenediaminetetraacetic acid and the "free" ethylene-diaminetetraacetic acid salt (EDTA). The resulting mixture is contacted with methanol at a ratio of methanol::reaction mixture of about 1.7:1 by volume, to precipitate the poly (2,6-dimethyl-1,4-phenylene ether), which is then filtered. The filtrate is a mixture comprising about 60% by weight of methanol, about 35% by weight of toluene, about 5% by weight of water, about 0.18 grams per liter of dissolved copper in the form of a complex with EDTA, and about 2.5 grams per liter of dissolved trisodium salt of EDTA. The molar ratio of EDTA salt: copper is about 2.5:1.

Reduction of Copper (II) EDTA Species

Reduction of the copper (II) EDTA complex is achieved as follows: A 500 mL three-necked flask is charged with 400 mL of water and 2.5 grams of $CuSO_4.5H_2O$ is dissolved, originating a light blue colored solution. The solution is treated with two equivalents of sodium bromide (NaBr). The color becomes a bit more greenish upon the bromide addition. Subsequently, 1.1 equivalents of EDTA tetra sodium salt (based on $Cu^{2+}$) is introduced. The color turns deep-blue and the mixture is stirred for 5 minutes followed by introducing 1.1 equivalents of $Al_2(SO_4)_3.16H_2O$. The color remains and after about another 5 minutes of stirring and 2.2 equivalents of a $NaHSO_3/Na_2S_2O_5$ mixture (effective $SO_2$ content 58.5%) is added. The color turns deep green and slowly becomes light blue in about 15 minutes. During this process a heavy white crystalline solid separates and is characterized as CuBr by comparison with an authentic sample. The resulting cuprous bromide can be recycled to the PPE polymerization process.

Reduction of Copper (II) NTA Species

Reduction of the copper (II) NTA complex is achieved as follows: A 500 mL three-necked flask is charged with 400 mL of water and 2.5 grams of copper sulfate pentahydrate ($CuSO_4.5H_2O$) is dissolved originating a light blue colored solution. The solution is treated with two equivalents of sodium bromide (NaBr). The color will become a bit more greenish upon bromide addition. Subsequently, 1.1 equivalent of nitriloacetic acid (NTA) tris-sodium salt (based on $Cu^{2+}$) is introduced. The solution color turns deep-blue. The mixture is stirred for about 5 minutes at room temperature (21° C.) and treated with 2.2 equivalents of a $NaHSO_3$/$Na_2S_2O_5$ mixture (effective $SO_2$ content 58.5%). The colored solution turns deep green and slowly becomes light blue in about 5–15 minutes and 1.2 equiv. of $Al_2SO_3$ is subsequently added. During this process a heavy white crystalline solid will separate and is characterized as CuBr by comparison with an authentic sample. Improvement in product yield is made by adding 1.1 equiv. of $Al_2(SO_4)_3 \cdot 16H_2O$ in order to expel the $Cu^+$ ion from the kinetically robust complex. The resultant cuprous bromide can be recycled into the PPE polymerization process.

The examples illustrate the formation of the copper catalyst species, the use of the copper catalyst species to make high molecular weight polymer and the recovery of the copper species with complexation. The reduction of the copper (II) complex into copper bromide is also illustrated for the EDTA and NTA examples. The resultant copper (I) bromide is available for use in a polymerization reaction.

What is claimed:

1. A process for preparing poly(phenylene ether) resins comprising:

(a) oxidatively coupling in a reaction solution at least one monovalent phenol species using an oxygen containing gas and a complex metal catalyst;

(b) recovering the complex metal catalyst of step (a) with an aqueous containing solution;

(c) reducing the recovered metal catalyst of step (b) to a lower oxidation state; wherein the reduction involves the use of a disproportionating metal salt; and (d) recycling the reduced metal catalyst of step (c) into the reaction solution of step (a).

2. The process of claim 1 wherein the complex metal catalyst of step (a) comprises a copper (I) species.

3. The process of claim 2 wherein the recovered metal catalyst of step (b) comprises a copper (II) species.

4. The process of claim 3 wherein in step (b), the recovery of the complex metal catalyst of step (a) comprises complexing the copper (II) species with a species selected from the group consisting of polyalkylenepolyamine polycarboxylic acids, aminopolycarboxylic acids, aminocarboxylic acids, aminopolycarboxylic acids, aminocarboxylic acids and polycarboxylic acids and their alkali metal, alkaline earth metal or mixed alkali metal-alkaline earth metal salts.

5. The process of claim 4 wherein the copper (II) species is complexed with a species selected from the group consisting of nitrilotriacetic acid trisodium salt, ethylene diaminetetraacetic acid tetrasodium salt, sodium tartrate, potassium tartrate, nitrilotriacetic acid, citric acid, glycine, hydroxyethylenediaminetriacetic acid, hydroxyethylenediaminetriacetic acid trisodium salt, diethylenetriaminepentaacetic acid, and diethylenetriaminepentaacetic acid pentasodium salt into a metal complex.

6. The process of claim 1 wherein in step (c), the reduction of the recovered metal catalyst of step (b) comprises contacting the recovered metal complex of step (b) with a halide source and with at least one reducing agent under reactive conditions.

7. The process of claim 6 wherein the reducing agent is selected from the group consisting of sodium hydrosulfite, sodium bisulfite, sulfur dioxide, sulfurous acid, sodium thionite, tin (II) chloride, iron (II) sulfate, chromium (II) sulfate and titanium (II) chloride.

8. The process of claim 1 wherein the disproportionating metal salt is selected from the group consisting of aluminum (III), zinc (II), iron (II), iron (III), and calcium (II) salts.

9. The process of claim 6 wherein the halide source is selected from the group consisting of chloride, bromide and iodide.

10. The process of claim 9 wherein the reduction of step (c) is accomplished between about 0° C. and 95° C.

11. The process of claim 6 wherein the amount of reducing agent is at least 1 molar equivalent based on the amount of the recovered metal species of step (b) to be reduced in step (c).

12. The process of claim 8 wherein the amount of the disproportionating metal salt is at least 1 molar equivalent based on the amount of the recovered metal species of step (b).

13. The process of claim 12 wherein the disproportionating metal salt is an aluminum sulfate.

14. The process of claim 1 wherein the recycling conditions of step (d) comprises an antisolvent.

15. The process of claim 5 wherein the copper species recovered comprises a complex formed between a copper (II) species and nitrilotriacetic acid. tris sodium salt.

\* \* \* \* \*